United States Patent [19]

Bosso et al.

[11] 4,071,428

[45] Jan. 31, 1978

[54] PROCESS FOR ELECTRODEPOSITION OF QUATERNARY AMMONIUM SALT GROUP-CONTAINING RESINS

[75] Inventors: Joseph F. Bosso, Lower Burrell; Marco Wismer, Gibsonia, both of Pa.

[73] Assignee: PPG Industries, Inc., Pittsburgh, Pa.

[21] Appl. No.: 744,534

[22] Filed: Nov. 24, 1976

[51] Int. Cl.² .......................................... C25D 13/06
[52] U.S. Cl. ................................................ 204/181 C
[58] Field of Search ........................................ 204/181

[56] References Cited

U.S. PATENT DOCUMENTS 3,928,157  12/1975  Suematsu et al. .................... 204/181

*Primary Examiner*—Howard S. Williams
*Attorney, Agent, or Firm*—William J. Uhl

[57] ABSTRACT

A method of cationic electrodeposition employing an aqueous dispersion of a quaternary ammonium salt group-containing resin is disclosed. The resin comprises the reaction product of a polymeric tertiary amine and a 1,2-epoxy-containing material.

10 Claims, No Drawings

PROCESS FOR ELECTRODEPOSITION OF QUATERNARY AMMONIUM SALT GROUP-CONTAINING RESINS

BACKGROUND OF THE INVENTION

1. Field of the Invention

The present invention relates to electrodeposition of ionically charged resins. More particularly, the present invention relates to electrodeposition of resins which contain a cationic charge.

2. Brief Description of the Prior Art

Electrodeposition as a coating application involves the deposition of a film-forming material under the influence of an applied electrical potential and has become of increasing commercial importance. Various resinous or polymeric film-forming materials have been developed for use in electrodeposition. Most of these resinous materials contain acid groups which are neutralized with a base such as an amine or an alkali metal hydroxide. These resin vehicles electrodeposit on the anode and because of their acidic nature tend to be sensitive to corrosive attack of alkali and salt. Further, during anionic electrodeposition, oxygen and metal ions evolved at the anode may discolor the depositing resin.

To overcome these problems, there has been a movement in the electrocoating industry to use cationically charged resins which deposit on the cathode during electrodeposition. Deposition on the cathode has the advantage over deposition on the anode in that only hydrogen is evolved at the cathode. Hydrogen evolution has no detrimental effect on the depositing resin, and in addition, cationically deposited resins frequently provide better corrosion resistance than anionically deposited resins.

An example of suitable cationic resins is found in U.S. Pat. No. 3,839,252 to Bosso et al. which discloses cationically charged resins for electrodeposition on the cathode which comprise the reaction product of a polyepoxide such as a polyglycidyl ether of a polyphenol with a tertiary amine acid salt such as the lactic acid salt of dimethylethanolamine.

SUMMARY OF THE INVENTION

The present invention provides for a method of electrocoating an electrically conductive surface serving as a cathode in an electrical circuit comprising the cathode, an anode and an aqueous electrodepositable composition. The resinous vehicle of the electrodepositable composition comprises the reaction product of:

1. a polymeric tertiary amine such as polymerizable tertiary amines such as polymers formed from unsaturated ester of the formula:

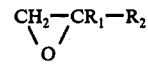

wherein $R_1$ and $R_2$ are the same or different and are alkyl, alicyclic or aryl groups which preferably contain from 1 to 8 carbon atoms; $R_3$ is $-(CH_2)_n-$ with $n$ having a value of 1 to 6; $R_4$ is hydrogen or alkyl containing from 1 to 8 carbon atoms;

2. a 1,2-epoxy-containing material having the structural formula:

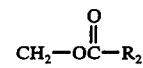

where $R_1$ is hydrogen and methyl and $R_2$ is hydrogen, alkyl, aryl in which the alkyl including cycloalkyl and aryl moieties preferably containing from 1 to 18 carbon atoms, substituted alkyl and aryl such as $CH_2OR_2$, $$CH_2-O\overset{O}{\underset{\|}{C}}-R_2$$

where $R_2$ is alkyl, including cycloalkyl, aryl, preferably in which the alkyl and aryl moieties contain from 1 to 18 carbon atoms. The reaction is conducted in the presence of acid and/or water to form the quaternary ammonium base group-containing polymer which is formed through reaction of the epoxy moieties with the tertiary amine moieties.

PERTINENT PRIOR ART

The reaction product of tertiary amine-containing acrylic polymer with alkylene oxides is known from U.S. Pat. No. 2,838,397. However, there is no teaching in this reference that the reaction products would be suitable for use in electrodeposition.

DETAILED DESCRIPTION

The polymeric tertiary amine used in the invention may be prepared from polymerizable tertiary amines such as by vinyl addition polymerization of unsaturated monomers at least one of which contains amino functionality. The amount of tertiary amine-containing monomer which is used is such that when the resultant polymer is quaternized, the resin will be dispersible in the aqueous medium and be of cationic character to be electrodepositable on the cathode.

Typical amine compounds used for vinyl copolymerization are as follows: amine-containing esters of monofunctional unsaturated acids of the general formula:

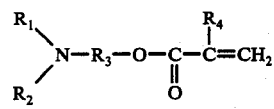

wherein $R_1$ and $R_2$ are the same or different and are alkyl, alicyclic or aryl groups which preferably contain from 1 to 8 carbon atoms, most preferably $R_1$ and $R_2$ are alkyl and contain from 1 to 4 carbon atoms; $R_3$ is $-(CH_2)_n-$ with $n$ having a value of from 1 to 6; and $R_4$ is an alkyl group which preferably contains from 1 to 8 carbon atoms or is hydrogen. Examples of such materials include acrylic or methacrylic esters of diethylaminoethanol and dimethylaminoethanol. Examples of other amine-containing esters are amine-containing diesters of difunctional unsaturated acids such as maleic acid, fumaric acid or itaconic acid esterified with alcohols of the general formula:

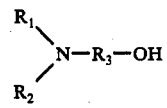

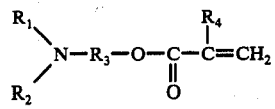

wherein $R_1$, $R_2$ and $R_3$ have the meanings as described above.

Examples of other amine compounds used for vinyl polymerization are vinyl-containing heterocyclic compounds such as N-vinylpiperidine or N-vinyl-3-pyrrolidone.

Copolymers of the above amine-containing compounds are those derived by addition polymerization of the above-mentioned amine-containing compounds as one monomer and at least one other monomer containing the group $>C=C<$ capable of vinyl addition polymerization. Examples of the above monomers include esters of acrylic acid or methacrylic acid with monobasic alcohols containing from about 1 to 8 carbon atoms such as methanol, ethanol and 2-ethylhexanol. Specific examples include methyl acrylate, methyl methacrylate, ethyl acrylate, ethyl metharcylate, butyl acrylate, butyl methacrylate, 2-ethylhexyl acrylate, 2-ethylhexyl methacrylate, octadecyl acrylate and octadecyl methacrylate.

Examples of other monomers include vinyl esters of saturated monobasic acids, for example, vinyl acetate, vinyl propionate, vinyl butyrate, vinyl laurate and vinyl stearate.

Also, vinyl aromatic compounds such as styrene, vinyltoluene and alpha-methylstyrene can be employed as the copolymerizable monomer. Examples of other monomers include acrylonitrile, methacrylonitrile, ethacrylonitrile, acrylamide, methacrylamide and ethacrylamide. Obviously, mixtures of copolymerizable monomers can be used. In certain instances it is desirable to provide the tertiary nitrogen-containing polymers with unreacted active hydrogens so that they may participate in a subsequent crosslinking reaction with a curing agent such as a blocked polyisocyanate, an amine-aldehyde condensate, and a phenol-aldehyde condensate. In these instances, it is desirable to introduce active hydrogens into the polymer by using active hydrogen-containing compounds as the copolymerizable monomer. Examples of suitable compounds would be unsaturated amides such as acrylamide, methacrylamide or their n-alkyl derivatives and/or unsaturated alcohols such as monoesters of diols with unsaturated acids, for example, hydroxypropyl or hydroxyethyl acrylate or methacrylate, N-butoxy acrylamide and N-butoxy methacrylamide.

Methods of preparing the addition type polymers mentioned above are well known in the art. Any known polymerization initiator of a free radical type compatible with amine-containing compounds and optionally a chain transfer agent can be used. Specific examples of suitable catalyst would be azobis(isobutyronitrile) and diazothioether. Examples of suitable chain transfer agents would be, for example, butyl mercapto-propionate and mercaptoethanol.

Other polymeric tertiary amines which are suitable in the practice of the invention are the reaction product of polyepoxides, such as a polyglycidyl ether of a polyphenol, with secondary amines. The polyepoxide utilized to form the tertiary amine-containing adduct is a polymeric material containing two or more epoxy groups per molecule. The polyepoxides are of relatively high molecular weight, having molecular weights of at least 350, usually within the range of about 350 to 2000. The polyepoxides can be any of the essentially well known types of polyglycidyl ethers of polyphenols, for example, bisphenols such as Bisphenol A, which are produced by etherification of the polyphenol with epihalohydrin in the presence of alkali.

The reaction of the secondary amine with the polyepoxide takes place upon admixing the amine and the polyepoxide. Reaction occurs by the secondary amine groups opening the epoxide ring forming a tertiary amine and a secondary hydroxyl group. The amine used is an organic secondary amine, usually a mono-secondary amine. Examples of such amines include di- lower alkyl amines and hydroxy-containing di- lower alkyl amines in which the alkyl group contains from 1 to 4 carbon atoms such as dimethylamine, diethylamine, dipropylamine, N-methylethanolamine, diethanolamine and the like. A solvent such as a water-miscible ester, ether or ketone may be employed in conducting the reaction. Reaction may be exothermic and cooling may be desired. However, heating to a moderate temperature, that is, within the range of 50° to 150° C., may be used to hasten the reaction. The amount of amine reacted with the polyepoxide is that which will be sufficient such that when the amine-epoxy adduct is subsequently quaternized, it will be dispersible in aqueous medium and of sufficient cationic character to be electrodepositable on the cathode. For a more detailed description on adducts formed by reacting a polyepoxide with a secondary amine, see U.S. patent application Ser. No. 547,327 to Jerabek, filed Feb. 5, 1975.

Although specific tertiary amine-containing polymers have been described above, it should be clear that other polymers could be used, for example, the Michael addition product of a polymer containing unsaturation with a secondary amine.

The 1,2-epoxy-containing materials which are used for quaternizing the tertiary amine-containing polymers are selected from those having the following structural formula:

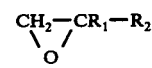

where $R_1$ is hydrogen and methyl and $R_2$ is hydrogen, alkyl including cycloalkyl, aryl preferably containing from 1 to 18 carbon atoms, substituted alkyl and aryl moieties such as $CH_2OR_2$,

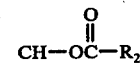

where $R_2$ is alkyl including cycloalkyl, aryl and substituted alkyl including cycloalkyl and aryl in which the alkyl and aryl moieties contain from 1 to 18 carbon atoms. $R_1$ and $R_2$ can be unsubstituted or substituted with substituents such as OH or alkoxy as long as the substituents do not interfere with the reaction of the epoxy with the amine-containing polymer, and the substituents are of such a nature or employed under conditions that they will not gel the reaction mixture. A preferred substituted group is one in which $R_1$ is an alkyl group substituted with an N-heterocyclic material, i.e.,

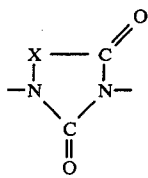

wherein X is a bivalent organic radical necessary to complete a 5 or 6-membered unsubstituted or substituted heterocyclic ring. Preferably, X is

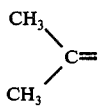

Examples of suitable 1,2-epoxy-containing materials are alkylene oxides containing from 2 to 8 carbon atoms including ethylene oxide, propylene oxide, 1,2-butylene oxide, 1,2-pentene oxide, styrene oxide and glycidol. Examples of other suitable materials are glycidyl esters of monobasic acids such as glycidyl acrylate, glycidyl methacrylate, glycidyl acetate, glycidyl butyrate, glycidyl palmitate, glycidyl laurate and glycidyl esters sold under the trademark CARDURA ® E. Other suitable materials are glycidyl ethers of alcohols and phenols such as butyl glycidyl ether, octyl glycidyl ether, phenyl glycidyl ether and para-(tertiary-butyl)phenyl glycidyl ether.

With regard to the amount of tertiary amine-containing polymer and 1,2-epoxy-containing material which are reacted with one another, the relative amounts can be varied and depend on the extent of quaternization desired, and this in turn will depend on the molecular weight and structure of the tertiary amine-containing polymer. The extent of quaternization, the molecular weight and structure of the tertiary amine-containing polymer should be selected such that when the quaternary ammonium base-containing polymer is mixed with an aqueous medium to form an electrodeposition bath, a stable dispersion will form. A stable dispersion is one which does not form hard sediments upon aging. If sediments occur, it can be easily redispersed with normal agitation. In addition, the dispersion should be of sufficient cationic character that the dispersed resin particles will migrate towards the cathode when an electrical potential is impressed between the anode and the cathode immersed in the aqueous dispersion. Also, the molecular weight, structure and extent of quaternary ammonium base group formation should be controlled so that the dispersed resin will have the required flow to form a film on the cathode. The film must be insensitive to moisture to the extent that it will not redissolve in the electrodeposition bath, or be rinsed away from the coated article after its removal from the bath.

The structure, molecular weight and degree of quaternization are dependent on one another and the selection of one can only be made after a consideration of the other two. For example, because of flow considerations, the quaternary ammonium base group-containing polymers prepared from tertiary amine-containing resins which are prepared from polyglycidyl ethers of polyphenols should be of lower molecular weight than many of the tertiary amine-containing polymers prepared from acrylic monomers mentioned above. In addition, higher molecular weight tertiary amine-containing polymers usually require higher quaternary ammonium group contents than lower molecular weight polymers.

In general, however, most of the quaternary ammonium group-containing polymers useful in the practice of the present invention have molecular weights preferably within the range of 600 to 60,000, although with certain polymeric species, higher molecular weights may be usable, and preferably contain from about 0.01 to 10 milliequivalents of quaternary ammonium group per gram of resin solids. Obviously one must use skill in the art to combine the molecular weight with the quaternary ammonium group content to arrive at a satisfactory polymer.

In reacting the polymeric tertiary amine with the 1,2-epoxy-containing material (hereinafter referred to as epoxy), usually a stoichiometric excess of epoxy is used so as to fully quaternize the available tertiary amine groups. However, the stoichiometry between the epoxy and the tertiary amine groups can be carefully controlled so as to get the optimum degree of quaternization desirable for electrodeposition.

The tertiary amine-containing polymeric material and the epoxy are reacted by mixing the components, preferably in the presence of a controlled amount of water. The amount of water employed should be that amount of water which allows for smooth reaction of epoxy groups but not sufficient to cause extremely slow or no reaction. Typically, the water is employed on the basis of about 1.0 to about 16 moles of water per equivalent of amine nitrogen.

Reaction temperature may be varied between the lowest temperature at which reaction reasonably proceeds, for example, room temperature, or in the usual case, slightly above ordinary room temperature, to a maximum temperature of about 120° C. Obviously, for lower molecular weight alkylene oxides such as ethylene and propylene oxide which have high vapor pressures at room temperature, lower reaction temperatures should be used, and, if desired, the reaction could be conducted under pressure to insure complete reaction. With higher molecular weight epoxies such as butyl glycidyl ether, higher reaction temperatures can be used.

A solvent is not necessary, although one is often used in order to afford better control of reaction. Aromatic hydrocarbons or monoalkyl ethers of ethylene glycol are suitable solvents.

The reaction of the polymeric tertiary amine and the 1,2-epoxy-containing material (epoxide) should be conducted in the presence of acid or water to form the quaternary ammonium salt or hydroxide. Preferably, reaction is conducted in the presence of acid because aqueous dispersions of the quaternary ammonium salt group-containing polymers electrodeposit as self-insulating films with greater rupture voltages and throwpower. Reaction can be conducted by first neutralizing the tertiary amine with acid to form the tertiary amine salt followed by reaction with the epoxide and water. Alternately, the epoxide, tertiary amine-containing polymer and acid can be reacted simultaneously or the amine and epoxide can be first reacted followed by acidification of the reaction product. Suitable acids are water-soluble organic acids such as formic acid, acetic acid, phosphoric acid or the like. The extent of quaternization desired will be that necessary to stably disperse the resin.

The term "dispersion" as used within the context of the present invention is believed to be a two-phase translucent or opaque aqueous resinous system in which the resin in the dispersed phase and water the continuous phase. The average particle size diameter of the resinous phase is generally less than 10 and preferably less than 5 microns. The term "dispersion" is also intended to cover homogeneous aqueous solutions which appear optically clear.

The concentration of the resinous products in the aqueous medium depends upon the process parameters to be used and is, in general, not critical, but ordinarily the major portion of the aqueous dispersion is water. For example, the aqueous dispersion may contain from 5 to 50 percent by weight resin solids.

Besides water, the aqueous medium may contain a coalescing solvent. The use of coalescing solvents provides in some instances for improved deposited film appearances. These solvents include hydrocarbons, alcohols, esters, ethers and ketones. The preferred coalescing solvents include monoalcohols, glycols and polyols as well as ketones and other alcohols. Specific coalescing solvents include isopropanol, butanol, isophorone, 4-methoxymethyl-2-pentanone, ethylene and propylene glycol, the monoethyl, monobutyl and monohexyl ethers of ethylene glycol, 2-ethylhexanol and tricresyl phosphate. The amount of coalescing solvent is not unduly critical and is generally between about 0.1 and 40 percent by weight, preferably about 0.5 to about 25 percent by weight based on total weight of aqueous medium.

In most instances, a pigment composition and, if desired, various additives such as surfactants or wetting agents are included in the dispersion. Pigment compositions may be any of the conventional type comprising, for example, inorganic pigment such as iron oxides, lead oxides, strontium chromate, carbon black, coal dust, titanium dioxide, talc, barium sulfate, as well as color pigments such as cadmium yellow, cadmium red, chromium yellow and the like. Organic pigments such as phthalocyanine blue and green and ultramarine blue may also be used and mixtures of pigments may be used. The pigment content of the dispersion is usually expressed as pigment-to-resin ratio. In the practice of the present invention, pigment-to-resin ratios within the range of 0.01 to 5:1 are usually used. The other additives mentioned above are present in the dispersion in amounts of at least 0.01, usually 0.01 to 5 percent by weight based on total weight of resin solids. The aqueous dispersion can also contain a curing agent for the electrocoating vehicle. Many of the electrocoating vehicles employed in the practice of the invention will contain active hydrogens such as hydroxyl and/or amine groups. In these instances, the curing agent should be those which are reactive with the active hydrogens. Examples include blocked isocyanates, phenolic resins and amine-aldehyde resins.

In the electrodeposition process employing the aqueous dispersions described above, the aqueous dispersion is placed in contact with an electrically conductive anode and an electrically conductive cathode with the surface to be coated being the cathode. While in contact with the aqueous dispersion, an adherent film of the coating composition is deposited on the cathode when a voltage is impressed between the electrodes.

The conditions under which the electrodeposition is carried out are, in general, similar to those used in electrodeposition of other types of coatings. The applied voltage may be varied greatly and can be, for example, as low as one volt or as high as several thousand volts, but typically between about 50 and 500 volts. The current density is usually between 1.0 ampere and 15 amperes per square foot and tends to decrease during electrodeposition, indicating the formation of a self-insulating film.

The method of the invention is applicable to coatings with any conductive substrate, especially metals such as steel, aluminum, copper, magnesium or the like. After electrodeposition, the coating is cured, usually by baking at elevated temperatures. Temperatures of from 90° to 260° C. for about 1 to 30 minutes are typical.

Illustrating the invention are the following examples, which, however, are not to be construed as limiting the invention to their details. All parts and percentages in the examples, as well as throughout the specification, are by weight unless otherwise specified.

EXAMPLE I

A tertiary amine-containing polymeric material was prepared by reacting an NCO-prepolymer with dimethylethanolamine. This polymer was then quaternized with lactic acid and propylene oxide.

| Charge | Parts by Weight | Number of Equivalents |
| --- | --- | --- |
| NCO-prepolymer[1] | 280 | 0.375 |
| dimethylethanolamine | 39.5 | 0.444 |
| cyclohexanone | 79.0 | |
| lactic acid (85% aqueous solution) | 23.0 | 0.222 |
| propylene oxide | 13.0 | 0.222 |
| water | 7.2 | |
| deionized water | 70.0 | |

[1]The NCO-prepolymer was a diisocyanate-polyalkylene glycol condensate having an equivalent weight of 747. The prepolymer is commercially available from E. I. duPont de Nemours and Company as ADIPRENE L-167.

The NCO-prepolymer was charged to a reaction vessel equipped with a stirrer, thermometer, condenser, inert gas purge and dropping bottle. The dimethylethanolamine, dissolved in the cyclohexanone, was added to the reaction vessel over the period of one hour during which time the reaction mixture exothermed. During the addition, the reaction temperature was controlled between 30° and 45° C. At the completion of the addition of the dimethylethanolamine, an infrared scan was taken to determine the presence of any unreacted NCO groups. The scan indicated a trace amount. An additional 6.2 grams of dimethylethanolamine was added after which an infrared scan indicated the reaction mixture was essentially free of NCO groups. The reaction mixture was then heated to 50° C. followed by the addition of the lactic acid solution. The reaction mixture was then heated to 90° C. followed by the addition of the propylene oxide with the first portion of water. The reaction was held between 90° and 95° C. for one hour followed by the addition of the second portion of deionized water. The resin was then cooled to room temperature and was found to have a solids content of 68.7 percent. The resin contained 0.89 milliequivalents of total base per gram of resin of which 0.527 milliequivalents were quaternary ammonium base groups.

The resin was let down with water to form a 5 to 10 percent solids electrodeposition bath. Steel panels were cathodically electrodeposited in this bath at room temperature at 150 volts for 90 seconds. The electrodeposited panels were then baked at 350° F. (177° C.) for 20 minutes to give a highly glossy, somewhat tacky coating.

EXAMPLE II

A tertiary amine-containing polymeric material was prepared by reacting a polyepoxide with a secondary amine. This polymeric product was then quaternized with butyl glycidyl ether and lactic acid.

The tertiary amine-containing polymeric material was prepared from the following charge:

| Ingredient | Parts by Weight |
|---|---|
| EPON 1001[1] | 54.2 |
| diethylamine | 3.5 |
| POLYMEG 1020[2] | 27.2 |
| ethyl CELLOSOLVE[3] | 10.5 |
| diethyl carbitol | 4.4 |

[1]Condensate of epichlorohydrin and Bisphenol A having a molecular weight of 950-1050 and an epoxy equivalent of 475-525 which is commercially available from Shell Chemical Company.
[2]Polyoxytetramethylene glycol having a molecular weight of 1020, commercially available from Quaker Oats Company.
[3]Ethylene glycol monoethyl ether.

The EPON 1001 and POLYMEG 1020 were charged under a nitrogen blanket to a reaction vessel and heated to 85° C. to melt all the reactants. The reaction mixture was cooled to 60° C. followed by the addition of the diethylamine. The reaction mixture exothermed and the reaction temperature was held at 155°–160° C. for about four hours, after which time the reaction mixture was cooled to room temperature and found to have a solids content of 88.7 percent, and also have a total nitrogen equivalent weight of 1767, that is, 1767 grams of resin per equivalent of nitrogen.

The polymeric tertiary amine-containing resin prepared as described above was quaternized from the following charge:

| Ingredient | Parts by Weight | Equivalents |
|---|---|---|
| polymeric tertiary amine-containing resin (89% total solids) | 441.7 | 0.25 |
| butyl glycidyl ether | 32.5 | 0.25 |
| lactic acid (85% aqueous solution) | 20.6 | 0.25 |
| deionized water | 9.0 | |

The polymeric tertiary amine-containing resin and water were charged to a 500 milliliter reaction kettle equipped with a stirrer, thermometer, condenser, dropping funnel and heating mantle. The contents in the reaction vessel were heated to 88° C. followed by the addition of the butyl glycidyl ether and lactic acid solution. The reaction was conducted for about 1½ hours while maintaining the temperature between 100° and 110° C. The resin had a pH of 5.4.

The resin was stored overnight and did not seem to be as dispersible the next morning as when it was freshly prepared. The resin was then cooked for an additional 3½ hours at about 100° to 105° C., after which time the pH was 7.3. The pH was adjusted to 6.5 with lactic acid and 50 milliliters of a monobutyl ether of ethylene glycol. The final resin had a solids content of 76.1 percent, an acid value of 5.1, an OH value of 246 and 0.56 percent by weight nitrogen. The resin contained 0.145 milliequivalents of quaternary ammonium salt groups per gram of resin solids.

Two hundred seventy-two (272) grams of the resin were then let down with 1630 parts by weight of deionized water to form a milky white dispersion which had a pH of 6.9. Steel panels were cathodically electrodeposited in this dispersion at a temperature of 80° F. (27° C.) and 250 volts for 90 seconds. A tacky wet film was obtained. The film was baked at 350° F. (177° C.) for 20 minutes to produce a film which was very glossy, free of pinholes and craters, although being very tacky. Baking a freshly deposited film at 400° F. (204° C.) for 20 minutes produced a tack-free film.

The polymeric tertiary amine-containing resin prepared as described above (140 parts) was combined with 16 parts by weight of an amine-aldehyde condensate curing agent (CYMEL 301 commercially available from American Cyanamid Company). The resin and crosslinker were then let down with 894 parts by weight of deionized water to form an electrodeposition bath. The pH of the bath was adjusted with 85 percent lactic acid to form a clear dispersion having a pH of 5.9. Steel panels were electrodeposited at room temperature and 300 volts for 90 seconds to form continuous wet films. The films were baked at 400° F. (204° C.) for 20 minutes to form glossy continuous films which were slightly tacky.

EXAMPLE III

An acrylic resin containing tertiary amine groups was quaternized with a mixture of propylene oxide and aqueous lactic acid. The tertiary amine-containing acrylic resin was prepared from the following charge:

| Ingredient | Parts by Weight |
|---|---|
| ethyl CELLOSOLVE | 1267 |
| tertiary dodecyl mercaptan | 38 |
| VAZO[1] | 19.2 |
| monomer mixture[2] | 1313 |
| VAZO | 3.8 |
| ethyl CELLOSOLVE | 269 |
| ethyl CELLOSOLVE | 384 |

[1]Azobisisobutyronitrile.
[2]Monomer mixture comprises 576 parts of ethyl acrylate, 576 parts of methyl methacrylate, 161 parts of dimethyl aminoethyl methacrylate.

The first portion of ethyl CELLOSOLVE containing the tertiary dodecyl mercaptan and the first portion of VAZO was charged to a reaction vessel and heated to reflux at 132° C. The monomer mixture was then added slowly resulting in the formation of a cloudy vapor. The monomer addition was stopped, the reaction mixture cooled to 120° C. and the monomer mixture addition initiated slowly. The monomer addition was continued over a period of 3 hours, keeping the reaction temperature between 120° to 125° C. The second portion of VAZO and ethyl CELLOSOLVE was added and the reaction mixture held at 120° C. for about 45 minutes followed by the third addition of ethyl CELLOSOLVE. The reaction mixture was kept at 120° C. for another hour and cooled to room temperature. The reaction mixture contained 39.7 percent solids (at 150° C.) as compared to a theoretical value of 41.7. The reaction mixture had an amine equivalent of 0.304 milliequivalents per gram of resin based on resin solids as compared to a theoretical value of 0.31.

The acrylic resin prepared as described above was quaternized with a mixture of lactic acid and propylene oxide in the following charge ratio:

| Ingredient | Parts by Weight |
| --- | --- |
| acrylic resin reaction mixture | 2500 |
| lactic acid (80% by weight aqueous solution) | 84 |
| propylene oxide | 44 |

The acrylic resin reaction mixture prepared as described above was charged with the aqueous lactic acid solution to a reaction vessel and heated to 90° C. for about 1 hour and 40 minutes. The propylene oxide was then added over a period of 20 minutes and the reaction mixture kept at a temperature of about 86°–93° C. for about 2 hours. The reaction mixture was then slowly cooled to room temperature. The reaction mixture had a solids content of 41.3 percent measured at 105° C. and contained 0.0283 milliequivalents of total base and 0.08 milliequivalents of quaternary ammonium base groups.

Four hundred thirty-five (435) parts by weight of the quaternized acrylic resin prepared as described above was thinned with 465 parts by weight of deionized water to form an electrodeposition bath which had a pH of 6.4.

Zinc phosphated steel panels were cathodically electrodeposited in this bath at 100 volts at a bath temperature of 77° F. (25° C.) for 60 seconds (peak amperage 1.6 amps, final amperage 0.04 amps) resulting in the deposition of a clear film. The film was baked at 400° F. (204° C.) for 20 minutes resulting in a glossy, tack-free light yellow film. Similar panels were cathodically electrodeposited at 125 volts at a bath temperature of 77° F. (25° C.) for 60 seconds (peak amperage 1.8 amps, final amperage 0.06 amps) resulting in a clear, colorless, wet film. The film was baked at 400° F. (204° C.) for 20 minutes resulting in a glossy, tack-free yellow film.

EXAMPLE IV

A tertiary amine-containing polymeric material was prepared by reacting a polyepoxide with a secondary amine. This polymeric product was then quaternized with propylene oxide and lactic acid.

A polyepoxide chain extended with neopentyl glycol was prepared from the following charge:

| Ingredient | Parts by Weight |
| --- | --- |
| EPON 829[1] | 1389.6 |
| Bisphenol A | 448.6 |
| neopentyl glycol adipate (molecular weight 530) | 364.7 |
| isophorone | 133.9 |
| benzyl dimethylamine | 4.7 |
| 88% aqueous lactic acid solution | 5.4 |
| isophorone | 348.1 |
| methyl ethyl ketone | 622.0 |

[1]Condensate of epichlorohydrin and Bisphenol A having an epoxy equivalent of 193-203 which is commercially available from Shell Chemical Company as a 96.5 percent solids solution in xylene.

The EPON 829 and Bisphenol A were charged to a reaction vessel and heated to exotherm at about 155° C., then held at this temperature for about one hour and 30 minutes. The reaction mixture was cooled to 125° C. followed by the addition of the neopentyl glycol adipate and isophorone. The benzyldimethylamine catalyst was then added and the reaction mixture held at about 125°–133° C. for about four hours (Gardner-Holdt viscosity determined at a 46.6 percent solution in ethyl CELLOSOLVE was W). The second portion of isophorone and the lactic acid solution was then added and the reaction mixture cooled to 115° C. followed by thinning with methyl ethyl ketone to form a 65 percent total solids reaction mixture which had an epoxy equivalent of 3260 (1520 for 100 percent solids).

Twenty-seven hundred (2700) parts of the reaction mixture were charged dropwise to 197.4 parts of a 40 percent by weight aqueous dimethylamine solution to form the tertiary amine adduct of the epoxy resin reaction mixture. The addition was over a period of 2 hours and the temperature was kept between 40° and 75° C. with moderate heating. The resulting adduct was clear. The tertiary amine adduct reaction mixture was then distilled to remove excess amine and was found to contain 0.79 percent by weight nitrogen as compared to a theoretical value of 0.87 percent. The reaction mixture had a solids content of 80.2 percent at 150° C. and contained 0.519 percent amine nitrogen.

The tertiary amine-containing epoxy resin prepared as described above was quaternized from the following charge:

| Ingredient | Parts by Weight |
| --- | --- |
| tertiary amine-containing reaction mixture | 400 |
| methyl ethyl ketone | 100 |
| 80% by weight aqueous lactic acid solution | 2.6 |
| propylene oxide | 13.0 |

The tertiary amine-containing reaction mixture prepared as described above was thinned with the methyl ethyl ketone, combined with the aqueous lactic acid solution, charged to a reaction vessel and heated to 90° C. for about 10 minutes. The propylene oxide was charged to the reaction mixture over a period of 10 minutes. The reaction mixture held at reflux between 84°–88° C. for about 4 hours and 15 minutes. The reaction mixture was then cooled to room temperature, found to have a total solids content at 105° C. of 67 percent and contained 0.420 milliequivalents of base and 0.239 milliequivalents of quaternary ammonium base groups.

One hundred twelve (112) parts by weight of the quaternized resin prepared as described above (75 parts solids) was thinned with 388 parts by weight of deionized water to form an electrodeposition bath having a pH of 6.5. Zinc phosphated steel substrates were cathodically electrodeposited in this electrodeposition bath at 250 volts at a bath temperature of 80° F. (38° C.) for 90 seconds, peak amperage 1.0 amp and final amperage 0.04 amp, to form a continuous colorless film on both sides of the panel. The film was then baked at 400° F. (204° C.) for 20 minutes to form a smooth, hard, yellow, glossy film.

We claim:
1. A method of electrocoating an electrically conductive surface serving as a cathode in an electrical circuit comprising said cathode, an anode and an aqueous dispersion of an electrodepositable composition, wherein the electrodepositable composition comprises the reaction product of:
   1. a polymeric tertiary amine,
   2. a 1,2-epoxy-containing material having the structural formula:

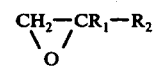

where $R_1$ is selected from the class consisting of hydrogen and methyl and $R_2$ is selected from the class consisting of hydrogen, alkyl including cycloalkyl, aryl and substituted alkyl and aryl; said reaction being conducted in the presence of acid and/or water to form the quaternary ammonium base group-containing polymer through reaction of the epoxy moieties with the tertiary amine moieties.

2. The method of claim 1 in which the polymeric tertiary amine is the addition polymer of an ester of the formula:

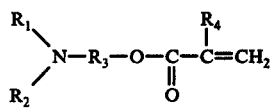

where $R_1$ and $R_2$ are the same or different and are alkyl, alicyclic or aryl groups, $R_3$ is $-(CH_2)_n-$ with $n$ having a value of 1 to 6, and $R_4$ is hydrogen or an alkyl group.

3. The method of claim 1 in which the polymeric, tertiary amine is the reaction product of:
A. a polyepoxide,
B. a secondary amine.

4. The method of claim 3 in which the polyepoxide is a polyglycidyl ether of a polyphenol.

5. The method of claim 1 in which the polymeric tertiary amine is formed from reacting an NCO-containing material with an alkanol tertiary amine.

6. The method of claim 1 in which the 1,2-epoxy-containing material is an alkylene oxide in which $R_1$ is selected from hydrogen and alkyl containing from 1 to 18 carbon atoms.

7. The method of claim 6 in which the 1,2-alkylene oxide is ethylene oxide or propylene oxide.

8. The method of claim 1 in which $R_1$ is an alkyl radical substituted with

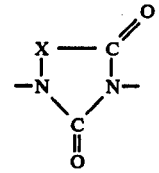

wherein X is a bivalent organic radical necessary to complete a 5 or 6-membered unsubstituted or substituted heterocyclic ring.

9. The method of claim 1 in which the electrodepositable composition contains a curing agent.

10. The method of claim 9 in which the curing agent is a blocked isocyanate.

* * * * *